Patented Aug. 3, 1937

2,088,838

UNITED STATES PATENT OFFICE 2,088,838

HARDENING MATERIAL RESISTANT TO HEAT, ACID, CORROSION, AND ABRASION, AND METHOD OF PRODUCING THE SAME

Norman W. Cole, Whittier, and Walter H. Edmonds, Los Angeles, Calif.

No Drawing. Application June 29, 1933, Serial No. 678,260

13 Claims. (Cl. 75—136)

Our inventions relate to resistant material; material that resists abrasion, corrosion, acids, and heat, and are particularly directed to new and useful compositions of matter having chromium and boron as important constituents.

In general terms, our inventions may be outlined as including: first, the new composition of matter having the formula $CrB_2$; second, the method herein disclosed for producing said composition together with certain concomitant materials, largely $CrB$ and $Cr_3B_2$; third, novel and useful compositions of matter incorporating said composition of matter or said concomitant materials either with or without said composition first mentioned; and, fourth, methods of producing and utilizing compositions of matter that incorporate said composition of matter in combination with one or more of said concomitant materials and other added materials.

The features peculiar to our invention, and the objects and advantages of our invention may best be understood by reference to the following detailed description covering the four aspects recited above.

The chemical compound of chromium and boron having the formula $CrB_2$ has, to our knowledge, never been found in nature, nor, heretofore, been described in literature as compounded and isolated in the laboratory. Our experiments at the present state indicate that the final product, $CrB_2$, has a brownish color, a crystal construction probably of the tetrahedral system, a specific gravity of approximately 4.2 to 4.55, and a hardness of approximately 8.5 or higher, Mohs' scale. We have found the crystals to be insoluble in sulphuric acid, hydrochloric acid, nitric acid, and potassium hydroxide; but the crystals will slowly dissolve in hydrofluoric acid to form a light green solution; and they are readily brought into solution after fusion with sodium peroxide in a nickel crucible. We have exposed these $CrB_2$ crystals to as high a temperature as 1350° centigrade without causing the crystals to fuse and with no indication of oxidation. Fusion has been accomplished, however, by means of an electric arc.

$CrB_2$ as produced by our process is a granular material that may be used as an abrasive in loose form for grinding and polishing surfaces. The $CrB_2$ crystals may also be incorporated in a suitable binder or matrix, as sodium silicate, shellac, rubber, or bakelite, to form grinding wheels for various purposes. The $CrB_2$ crystals may be incorporated in a metal body to increase the hardness and tensile strength of the body, or may be associated with the surface of the metal body to resist abrasion, corrosion, acids or heat. For such purpose, the crystals may be incorporated in the body of metal by mixing the crystals with the comminuted metal, heating the mixture above the melting point of the metal and then casting the resultant; or the crystals may be mixed with comminuted metal to form a briquet that may then be fused by heat into a coherent body particularly suitable for a cutting or drilling tool.

The $CrB_2$ crystals may be applied to the surface of a metal body in various ways. For instance, the crystals may be applied with an adhesive to the interior walls of a mold in which metal is subsequently poured; or the crystals may be superficially embedded in the surface of metal heated to a suitable molten state; or, as will be further explained later, the crystals may be incorporated in a matrix suitable for fusion with the surface of a metal body.

To produce an acid-resistant surface on any body, the $CrB_2$ crystals may be incorporated in a suitable carrier for painting the surface, or, preferably, the surface will first be covered with a suitable adhesive coating against which the $CrB_2$ crystals in a finely divided state will be sprayed in profusion. Other applications of $CrB_2$, based upon its useful characteristics, will readily occur to those versed in the arts related to our inventions.

We have discovered that our preferred process is of special value in that it produces with $CrB_2$ certain concomitant materials peculiarly adapted to constitute a matrix in the very form in which they are produced. In fact, our process may be carried out in a sequence of steps to create the $CrB_2$ crystals and the concomitant matrix concurrently, the $CrB_2$ crystals being thereby distributed uniformly in the matrix and intimately associated therewith.

This product, $CrB_2$, and the concomitant matrix unified therewith, is now known by the trade-mark "Colmonoy", and is usually produced in granulated form, each granule comprising minute crystals of $CrB_2$, of the order of .001 inch in length, embedded in a mass of united crystals of the concomitant matrix, the matrix crystals being .005 to .02 inch in length. The process may stop with the production of the "Colmonoy" crystals, or further steps may be taken for the purpose of isolating the $CrB_2$ crystals therefrom.

Our preferred mixture for the alumino-thermic reaction comprises:

| | Per cent |
|---|---|
| Chromic anhydride $CrO_3$ | 46.25 |
| Boron trioxide $B_2O_3$ | 16.25 |
| Powdered aluminum | 37.50 |

When this mixture is ignited in a crucible, an exothermic reaction proceeds violently to the bottom of the crucible where a molten mass accumulates and cools to a solid conglomerate body beneath a crust of slag and aluminum in free and compounded state.

Besides $CrB_2$, $CrB$ and $Cr_3B_2$, this conglomerate may contain chromium, boron, and aluminum, these latter being in free, compounded or alloyed state. Under the usual conditions of manufacture, iron also is usually introduced into this resultant.

To reduce this conglomerate to a more uniform material, narrowed down to the constituents pertinent to our invention, the solidified material is then crushed, pulverized, washed, and treated with a suitable acid, such as hydrochloric acid of specific gravity 1.1. Preferably, the digestion in the acid is extended over a period of ten or twelve hours. The residue, amounting usually to 75 to 80% of the original conglomerate, constitutes the so-called "Colmonoy" crystals. It may be noted here that the crushing and pulverizing operations may be eliminated by simply exposing the conglomerate body to the atmosphere for several weeks, such exposure causing the body to disintegrate into a finely divided mixture of Colmonoy crystals and other material. The digestion in hydrochloric acid may also be omitted, since the associated products such as aluminum, chromium and boron in free and compounded state do not interfere with some applications of our invention.

It is to be understood that included within our invention is the material produced by carrying out the above described process up to the point of the treatment with hydrochloric acid. In other words, our invention includes the powdered conglomerate which usually, as suggested above, is refined, as by acid treatment, to produce the so-called Colmonoy crystals.

This "unrefined" material is formed from chromium, boron and aluminum. The percentages of these elements in the unrefined material depend somewhat upon the nature of the tool or other body to which the unrefined material is to be applied, as well as upon the intended use of the tool or body. The following table shows what we now consider the practicable limits of the percentages of these elements:

| | Per cent |
|---|---|
| Chromium | 40 to 85 |
| Boron | 5 to 50 |
| Aluminum | 1 to 25 |

A very satisfactory unrefined material, and one that we now prefer for general purposes, contains these elements in the following percentages:

| | Per cent |
|---|---|
| Chromium | 63 |
| Boron | 27 |
| Aluminum | 10 |

The precise constituents of Colmonoy crystals vary with the proportions of the original mix, the purity of materials used, and the efficiency of the refining process. A typical finding by "indirect analysis" in the laboratory is as follows:

| | Per cent |
|---|---|
| $CrB_2$ | 1.38 |
| $CrB$ | 55.0 |
| $Cr_3B_2$ | 39.9 |
| Al | 4.5 |
| Fe | 1.2 |
| | 101.98 |

From a number of such analyses we have concluded that the ranges of variation of the three important constituents are:

| | Per cent |
|---|---|
| $CrB_2$ | 1–3 |
| $CrB$ | 50–90 |
| $Cr_3B_2$ | 10–40 |

The $CrB_2$ crystals may be isolated as a residue by boiling the Colmonoy crystals in sulphuric acid of specific gravity 1.3 under a reflex condenser for twelve to seventy-two hours. The sulphuric acid dissolves the $CrB$, $Cr_3B_2$ and other of what we term concomitant materials contained in the Colmonoy crystals.

A sample of these insoluble crystals produced under the conditions of commercial manufacture was analyzed as follows:

| | Per cent |
|---|---|
| Chromium | 35.15 |
| Boron | 29.95 |
| Aluminum | 15.32 |
| Iron | 17.44 |
| | 97.86 |

A further study of the same sample indicated that the elements were present in the following forms:

| | Per cent |
|---|---|
| $CrB_2$ | 49.78 |
| $FeB$ | 18.89 |
| $AlB_2$ | 27.59 |
| $Fe_2O_3$ | 2.73 |
| | 98.99 |

A second sample produced with unusual care in the laboratory was assayed as follows:

| | Per cent |
|---|---|
| Chromium | 68.78 |
| Boron | 29.22 |
| Aluminum | 1.11 |
| Iron | 2.66 |
| | 101.77 |

Further study of this second sample indicated that the elements were combined as follows:

| | Per cent |
|---|---|
| $CrB_2$ | 97.30 |
| $FeB$ | 3.17 |
| $AlB_2$ | .47 |
| $Al_2O_3$ | 1.56 |
| | 102.50 |

The important conclusion to be drawn from these analyses is that there is a sufficient quantity of boron present to account for $CrB_2$ and additionally to account for the $FeB$ and $AlB_2$ present. The iron in the analyses above is accounted for by impurities in the commercial ingredients such as scale and rust from containers.

It is possible, with care, as indicated above, to reduce the proportion of the iron and aluminum in the so-called concomitant materials. We have not found it necessary, in commercial practice, to keep this proportion down; and, moreover, these materials so readily combine with $CrB$ and $Cr_3B_2$ in the Colmonoy crystals and so readily blend with $CrB_2$ when $CrB$ and $Cr_3B_2$ are dissolved out of Colmonoy crystals, that we do not regard them as undesirable impurities. On the contrary, further experiments are projected to explore the possibility that one or more of these concomitant materials may have functions in our inventions that may be identified.

We do know that the Colmonoy crystals are of crystal structure, i. e., that the individual crystals of $CrB_2$ are interspersed in a matrix comprising mostly united crystals of CrB; and the matrix may be in part or in total in the nature of a solid solution.

It is obvious that the structure and the composition of the Colmonoy crystals will be affected by the proportions of the original mix, as well as the conditions surrounding the above described process. If the proportion of aluminum specified in our preferred mixture above is substantially reduced, the alumino-thermic reaction will be incomplete; if the proportion of aluminum is substantially increased, then the proportion of aluminum combined with other elements in the Colmonoy crystals will be increased. Experiments indicate that the proportion of $CrB_2$ in the Colmonoy crystals may be increased by increasing the intensity and duration of the reaction, or by increasing the proportions of $B_2O_3$ and aluminum in our mix. The size of the $CrB_2$ crystals probably may be increased by carrying out the reaction under pressure and causing the molten product to cool over a more extended period of time.

The significance and importance of our preferred mixture may be understood by considering the atomic relationships involved, calculating the heat produced, and studying the effect of substituting $Cr_2O_3$ for $CrO_3$.

The reaction produced by a mixture comprising chromic anhydride 46.25%, boron trioxide 16.25%, and powdered aluminum 37.50%, is represented by the equation:

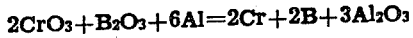

$$2CrO_3 + B_2O_3 + 6Al = 2Cr + 2B + 3Al_2O_3$$

By substituting heats of formation in the usual manner, it may be computed that this reaction produces 644,400 calories. If the heat capacities of the products are used, leaving chromium and boron in the elementary states (since no data on the heat of formation of chromium borides is available) a theoretical temperature of approximately 13,900° F. is found. Now, an ordinary "Thermite" reaction with iron oxide develops an actual temperature that is approximately 68 per cent of its theoretical temperature calculated as above. Applying the same correction to the theoretical temperature 13,900° F., a temperature of approximately 9400° F. is indicated.

If $Cr_2O_3$ is substituted for $CrO_3$ to obtain the same quantities of chromium and boron in the reaction, thus:

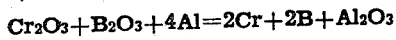

$$Cr_2O_3 + B_2O_3 + 4Al = 2Cr + 2B + Al_2O_3$$

the "probable" temperature produced is only 5090° F.

This comparison emphasizes the importance of the particular oxide selected. The mixture corresponding to the second equation is not operative, since it fails to produce a temperature sufficiently high to form $CrB_2$. From experience with various reactions applicants have concluded that a temperature substantially in excess of 7000° F. is required to produce $CrB_2$.

The unusual resistance to abrasion that characterizes the Colmonoy crystals may be explained in part by considering certain facts. In the first place, the incorporated $CrB_2$ crystals distributed throughout the body and surface of the matrix are extremely hard and refractory; second, we have the combination of the abrasive $CrB_2$ crystals with a crystalline matrix, which matrix is itself resistant to wear; third, by virtue of the $CrB_2$ crystals and the crystalline matrix being formed concurrently, the two are more intimately associated than is possible in a product obtained by merely mixing an abrasive into a matrix; fourth, because the $CrB_2$ crystals and the crystalline matrix are formed in a fluid condition and both remain fluid until the mixture drops below the melting point of the $CrB_2$ crystals, and because the violent reaction thoroughly agitates the intermixed crystals in fluid state, the $CrB_2$ crystals are uniformly distributed throughout the matrix; and, fifth, the $CrB_2$ crystals, as produced by our method, are extremely small and, therefore, are not as readily disjoined from the matrix as would be the case were the $CrB_2$ crystals relatively large.

It will be noted that the above features relate to the physical structure of the Colmonoy crystals. In other words, the combination of $CrB_2$ and the matrix is particularly effective because of the abrasive-resistant character of the $CrB_2$ crystals and the matrix, because of the exceptional bond between the two, and because of the minute size of the $CrB_2$ crystals.

In developing our invention, we have discovered that in addition to serving strictly as a matrix for the $CrB_2$ crystals, the concomitant materials in Colmonoy crystals may have important roles in combining $CrB_2$ crystals with other substances for various purposes. For instance, it has been stated above that the isolated $CrB_2$ crystals may be incorporated in a metal body by mixing the crystals with the comminuted metal and then heating and casting the metal. Such a combination is not readily achieved, because the $CrB_2$ crystals tend to float on the surface of a heavy metal bath in a manner not conducive to uniform distribution through the metal, and the crystals that do enter the molten metal do not have the desired intimate association with the metal body. If the Colmonoy crystals, i. e., $CrB_2$ mixed with CrB, $Cr_3B_2$ and other concomitant materials, are intermixed with the comminuted metal, the desired results are readily achieved. Usually the CrB, $Cr_3B_2$ and the other concomitant materials in molten state enter into solid solution or chemical combination with the metal as the metal cools, whereas the $CrB_2$ maintains the crystal form throughout. Since the melting point of $CrB_2$ is substantially above that of a heavy metal, the $CrB_2$ maintains its crystal form while the metal is still fluid, with the result that the crystals are in close bond with the metal when the entire mixture solidifies.

It is apparent, then, that CrB, $Cr_3B_2$ and the other concomitant materials serve, in effect, as a flux promoting the incorporation of $CrB_2$ into the metal body and facilitating uniform distribution of the $CrB_2$ crystals throughout the metal body. When the mixture cools, the fact that the concomitant materials, including CrB and $Cr_3B_2$, have a physical affinity for the $CrB_2$ crystals, and a tendency to enter either into chemical combination or solid solution with the metal, insures the intimate association of the $CrB_2$ crystals with the metal. The presence of these component materials brings about a finer grained and more coherent solid than we have been able to obtain in their absence.

We have reason to believe that this excellence of grain is promoted by the fact that the refractory $CrB_2$ crystals in the molten bath of concomitant materials and metal serve as nuclei of crystallization; by virtue of the so-called "flux action" of the concomitant materials, these countless nuclei are evenly distributed, hence the fine grain of the solidified product. The concomitant materials, together with the $CrB_2$ crystals in a metal body, constitute a combination in which each element has a function bearing on the result produced by the combination.

It will be noted that the important effects achieved by incorporating these concomitant materials in a metal are not those resulting from simply mixing elemental boron and elemental chromium as such into a metal bath. A distinctive result is obtained by combining these two elements into what we have termed concomitant materials before introduction into the metal bath.

Likewise, it is exceedingly difficult to bond the isolated $CrB_2$ crystals to the surface of a metal in a satisfactory manner; but when the $CrB_2$ crystals, mixed with the concomitant materials, are placed on the surface of a steel body, for instance, and the surface then subjected to the heat of a welding torch, the concomitant products may be fused into the metal body, forming with the embodied $CrB_2$ crystals an outer layer integral with the metal body. Because of the resistant character of $CrB_2$ in combination with the matrix of concomitant materials, such a procedure constitutes, in effect, a superior process of case-hardening.

The development of this aspect of our invention, i. e., the peculiar effectiveness of adding the concomitant materials to combinations of $CrB_2$ with other metals, may be appreciated by considering illustrative compositions of matter.

The proportion of Colmonoy crystals to the metal or alloy body, as well as the particular alloy to be used, will depend upon the particular purpose in view, intelligent variation being within the skill of the artisan. Generally speaking, the higher the degree of hardness, or resistance to corrosion, acid or abrasion required, the higher the percentage of Colmonoy crystals employed. For example, where toughness is the most important of the characteristics desired in the product, the percentage of the Colmonoy crystals may be as low as 12%, whereas a cutting tool to be used on a lathe or for drilling may incorporate 90% of Colmonoy crystals.

A tough cutting tool having a low melting point may be constituted as follows:

| | Per cent |
|---|---|
| Colmonoy crystals | 12 to 16 |
| Tungsten, comminuted | 12 to 16 |
| Iron, comminuted | 68 to 76 |

When these constituents are melted in a crucible, and then allowed to cool, the $CrB_2$ crystals will be uniformly distributed throughout the solid mass, while the concomitant materials in the Colmonoy crystals will alloy or otherwise combine with the tungsten and iron.

An exceedingly hard tool, highly resistant to abrasion and acids, and having a high melting point, may be constituted as follows:

| | Per cent |
|---|---|
| Colmonoy crystals | 75 to 90 |
| Nickel, comminuted | 10 to 25 |

Here, again, the concomitant materials alloy or otherwise combine with the nickel, while the $CrB_2$ crystals remain unaffected.

A method has heretofore been described of producing an extremely resistant material by heating a briquet of powdered metal and $CrB_2$. Such a briquet is held together by fusion of the metal alone, the crystals simply being trapped within the metal mass. If, however, Colmonoy crystals are used instead of isolated $CrB_2$, the concomitant materials will also fuse, producing a sintered effect, thereby strengthening the finished product and more intimately combining the $CrB_2$ crystals with the metal body.

We have found that if both nickel and iron are included in the composition, a stainless steel having desirable qualities may be obtained. For such a product, we suggest the following proportions:

| | Percent |
|---|---|
| Colmonoy crystals | 6 |
| Nickel, comminuted | 19 |
| Steel, comminuted | 75 |

The use of Colmonoy crystals to produce a resistant facing on metal bodies may be appreciated by considering illustrative procedures.

The application of Colmonoy crystals to a steel tool by fusion has already been mentioned. Contrary to the usual method of case-hardening, our procedure of fusing Colmonoy crystals to the face of a steel body may be arranged to avoid introducing carbon into the body. This fact is important when it is desirable to retain in a metal base the toughness characteristic of a mild steel having a low carbon content. We have found that when the Colmonoy crystals are fused to the surface of a mild steel body, the matrix of the concomitant materials actually draws carbon from the steel body, and that the carbon so derived may actually increase the hardness of the matrix that coats the steel body.

It should also be pointed out at this point that the Colmonoy crystals are so light that one pound will cover an exceptionally large area, roughly, three times the area that will be covered with the equivalent weight of tungsten carbide.

In addition to the simple procedure of fusing Colmonoy crystals to the surface of a metal, a "case-hardening" may be achieved by various other procedures. For instance, the matrix of the surfacing composition may include a metal in addition to the so-called concomitant materials of the Colmonoy crystals. In such case, the Colmonoy crystals may be first combined with the metal to make a solid material suitable for surfacing tool steel, and then this solid material may be fused to the surface of the tool steel. Nickel may be so used as a constituent in the matrix of the surfacing composition. The combination of Colmonoy crystals with nickel, cobalt or other metal that resists oxidation, is suggested. The so-called concomitant materials in the Colmonoy crystals alloy with the nickel in the surfacing compound and when the surfacing compound is fused to the metal tool, this matrix of nickel and the concomitant materials tends to alloy or otherwise combine with the body of the tool.

While, as has been stated above, a metal base may be surfaced by sweating in the isolated $CrB_2$ crystals, or by sweating in the Colmonoy crystals, we have found such processes less convenient, less economical, less practical, and the result less satisfactory in general than in the case of this third method in which the Colmonoy crystals are first fused with a metal to make a surfacing compound. Our preferred formula is:

| | Percent |
|---|---|
| Colmonoy crystals | 95 |
| Pulverized nickel | 5 |

This mixture is fused in a crucible and cooled to a solid, which solid is then pulverized by the action of a crusher followed by a ball mill. The final product may be screened into various grades, the finer grades being desirable for smooth wear-resisting surfaces, intermediate grades being selected for tools, and the coarser grades being useful for abrasive surfaces.

That the methods of applying this Colmonoy-nickel composition are flexible and its range of uses extensive, may be indicated by examples:

A thin coating resistant to acids and oxidation may be formed by brushing the Colmonoy-nickel composition on the surface of the base in a suitable transient liquid binder and then fusing the Colmonoy product into the metal base by heating with an oxy-acetylene torch.

If a heavier case is desired, the initial step may consist in coating the metal base with a sodium silicate solution and then sprinkling the adhesive surface with the composition. If the metal base is heavy it may be preheated in a furnace just prior to application of the crystals with the torch.

A light coat is sufficient to resist wear where the metal base is part of a machine subjected to simple metal-to-metal friction; heavier coats are desirable for cutting tools and drills, for resisting acids, and for lining furnaces to resist high temperatures. Alloy steel tools so surfaced may be subsequently heat treated, the case not interfering with the heat treatment and the heat treatment not affecting the case.

The Colmonoy-nickel composition when applied as suggested results in a surface having a hardness of approximately 9.

Mild steel may be introduced into the matrix of the resistant coating by placing Colmonoy crystals on the metal base and then heating electrically with a mild steel electrode or using a mild steel welding rod and an oxy-acetylene torch to fuse the mild steel and Colmonoy crystals.

For the purpose of facilitating these latter processes for applying a resistant surface to metal bodies, we have found it desirable to combine the Colmonoy crystals or the above Colmonoy-nickel composition with any desirable fusible metal to form a welding rod or electrode. The Colmonoy crystals or the Colmonoy-nickel composition may be cast in the body of the rod, or may be incorporated as a core in a tubular metal rod, or may simply be fused to the surface of a rod, or applied to the surface of a rod by means of an adhesive binder. When such a rod is applied to a metal body, as in a welding process, the metal of the rod modifies the crystalline matrix containing the $CrB_2$ crystals, and the resultant matrix fuses, alloys or otherwise combines with the metal body.

For the purpose of completely disclosing our invention and illustrating the principles involved, we have given specific formulas and detailed methods, but our invention suggests a wide range of formulas and methods and we do not confine ourselves to the precise examples disclosed. We reserve the right to all variations and modifications of our formulas and methods that properly lie within the scope of our appended claims.

Having described our invention, we claim:

1. The chemical compound having the formula $CrB_2$.

2. A composition of matter comprising $CrB_2$ crystal embedded in a matrix including CrB crystals.

3. $CrB_2$ crystals embedded in a matrix of CrB and other concomitant materials produced by the alumino-thermic reduction of intermixed chromium oxides and boron oxides.

4. A composition of matter comprising $CrB_2$ crystals in a matrix comprising one or more metals and CrB in solid solution.

5. The method of producing a hard crystalline abrasive in a matrix of united crystals of comparable hardness, said method comprising: reducing a chromium oxide and a boron oxide at above 7000° to produce a quantity of $CrB_2$ intermixed with a quantity of CrB, and then cooling the mixture to solidification.

6. The method of producing a resistant material, said method comprising igniting a mixture of a chromium oxide, a boron oxide, and aluminum to produce a reaction at above 7000° F., cooling the resultant to a solidified mass, and crushing and washing the mass to a residue of CrB, $CrB_2$ and concomitant materials.

7. The method of producing a resistant material, said method comprising igniting a mixture of a chromium oxide, a boron oxide, and aluminum to produce a reaction at above 7000° F., cooling the resultant to a solidified mass, and crushing and washing the mass to a residue of $CrB_2$ and concomitant materials, then digesting out substantially all said concomitant materials to isolate $CrB_2$ as the final product.

8. The method of forming and isolating crystals of chromium boride which consists in mixing chromic anhydride, boron trioxide and finely divided aluminum, igniting the mixture and producing by exothermic reaction the said crystals in a matrix including aluminum, dissolving with an acid said matrix and separating the crystals from the acid solvent.

9. The method as set forth in claim 8 in which the mixture to be ignited comprises approximately chromic anhydride 46%, boron trioxide 16% and aluminum 38%.

10. A resistant material comprising $CrB_2$, CrB, and $Cr_3B_2$.

11. A resistant material comprising $CrB_2$ and a chromium boride of lesser boron content than $CrB_2$.

12. A composition of material comprising $CrB_2$ crystals embedded in a solid solution including boron and a chromium boride of lower boron content than $CrB_2$.

13. A method of producing chromium borides that consists in the alumino-thermic reduction of a mixture of $CrO_3$ and $B_2O_3$.

NORMAN W. COLE.
WALTER H. EDMONDS.